Figure 1:
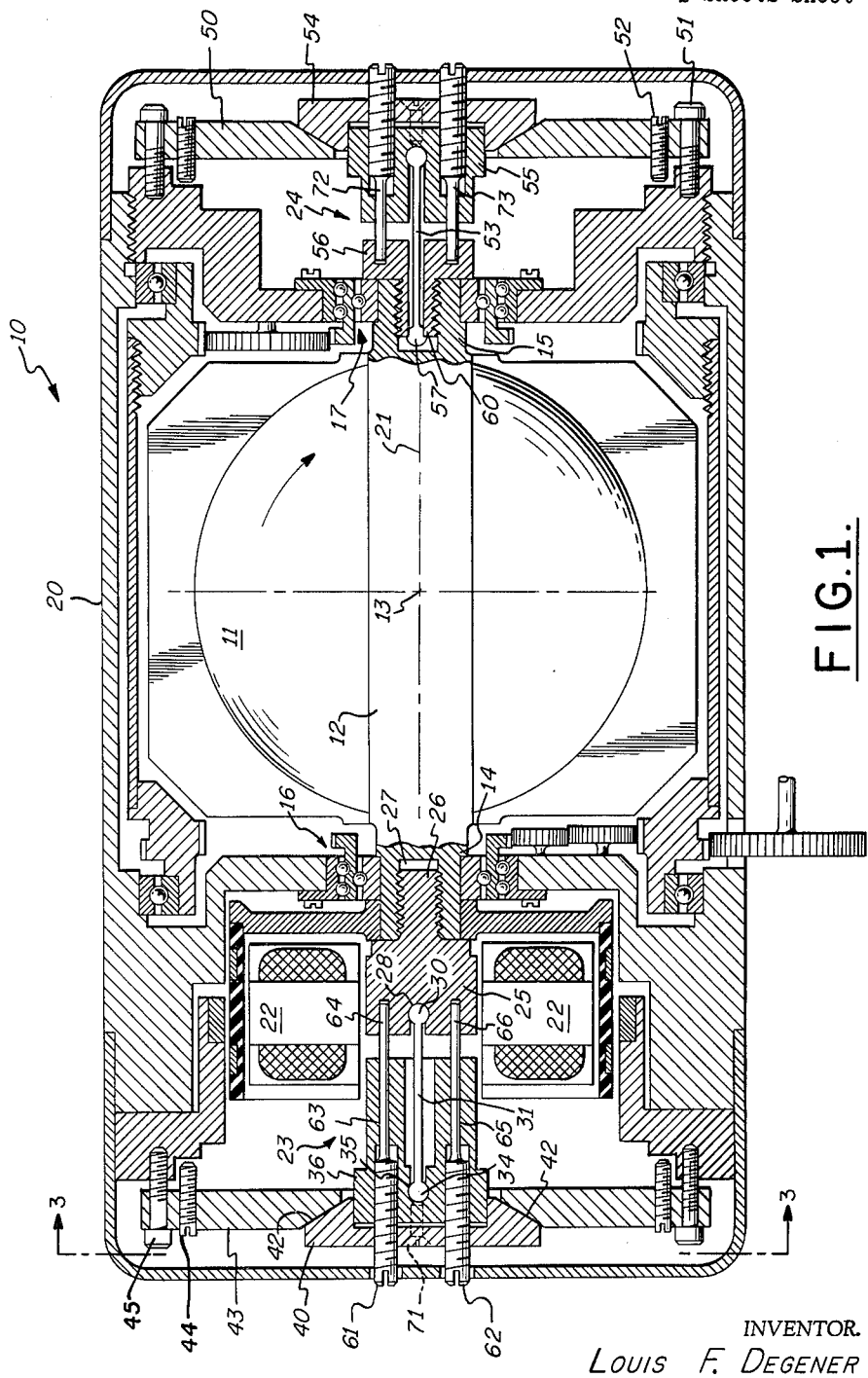

May 24, 1966  L. F. DEGENER  3,252,337
GYROSCOPIC APPARATUS
Filed Nov. 16, 1962  2 Sheets-Sheet 1

INVENTOR.
LOUIS F. DEGENER
BY
ATTORNEY

May 24, 1966 L. F. DEGENER 3,252,337
GYROSCOPIC APPARATUS
Filed Nov. 16, 1962 2 Sheets-Sheet 2

INVENTOR.
LOUIS F. DEGENER
BY
ATTORNEY

United States Patent Office 3,252,337
Patented May 24, 1966

3,252,337
GYROSCOPIC APPARATUS
Louis F. Degener, South Ozone Park, N.Y., assignor to Sperry Rand Corporation, Great Neck, N.Y., a corporation of Delaware
Filed Nov. 16, 1962, Ser. No. 238,107
3 Claims. (Cl. 74—5)

The present invention relates to gyroscopic apparatus and particularly to apparatus which prevents axial movement of the rotor bearing frame while permitting angular movement thereof. More particularly, the present invention relates to torsion element apparatus for use in gyroscopes and apparatus for assembling and protecting the delicate torsion element apparatus within the gyroscope.

One of the problems encountered in gyroscopic apparatus is to provide a support for the rotor bearing gimbal frame which permits the gyro to precess about an axis defined by the trunnions which support the gimbal frame while preventing the gimbal frame, and consequently the rotor, from moving relative to its housing in the direction of the axis defined by the trunnions. Apparatus which endeavored to solve this problem prior to the present invention were usually complex, expensive, and difficult to control. Further, no provisions were previously made to protect the delicate elements during and after assembly but prior to actual use thereby causing breakage of the delicate elements.

An additional problem inherent in gyroscopic suspensions of this nature involve the undesirable coercive effects caused by prior art torsional suspension devices.

It is a primary object of the present invention to provide suspension apparatus for gyroscopes that prevents axial movement while permitting rotational movement with respect to a predetermined axis which introduces a minimum of undesirable coercion and is relatively economical to manufacture.

It is a further object of the present invention to provide gyroscopic suspension apparatus in which the delicate portion thereof is protected during assembly and prior to actual use.

The above objects are achieved by a torsion bar suspension apparatus and installation assembly which utilizes a delicate torsion bar suspended between and centralized within two spaced adapters having simple securing means. The delicate torsion bar is protected during assembly by two rods which extend through respective apertures in the adapters and prevent rotation of the adapters relative to each other during assembly and prior to actual use. During assembly, the rods also act as a spanner wrench for assembling the suspension apparatus within the gyroscope.

Figure 2:
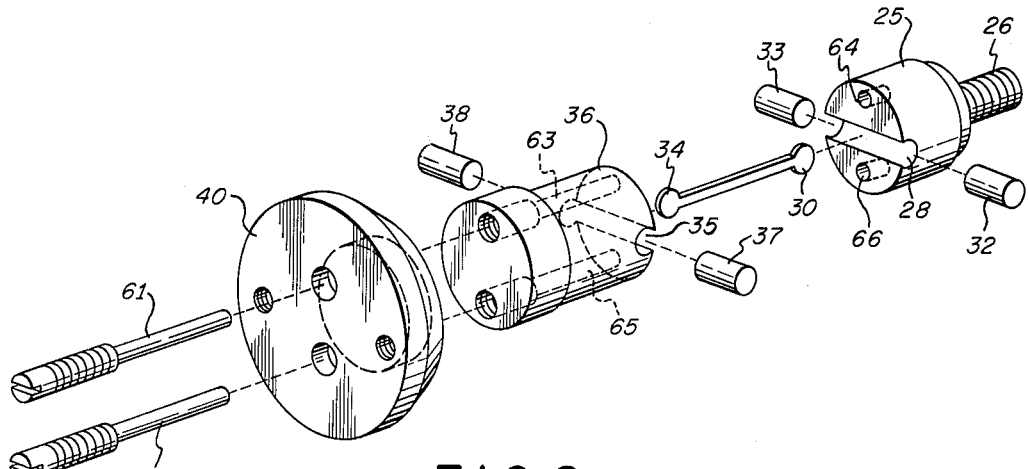
Figure 3:
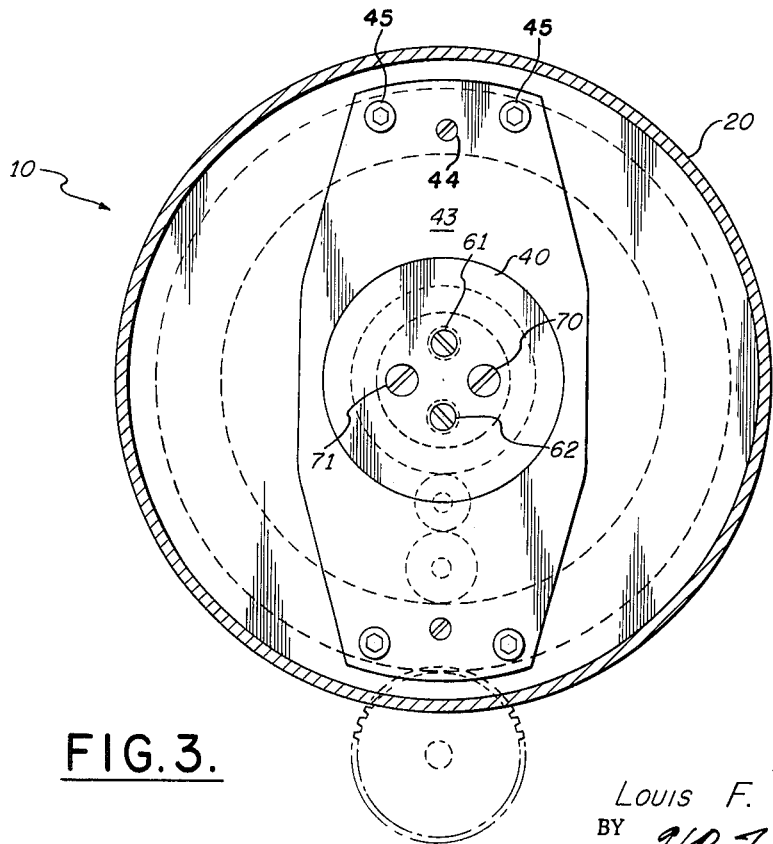

Referring to the drawings,

FIG. 1 is a side elevation in section of a gryroscope incorporating the present invention, FIG. 2 is an exploded view of the torsion bar suspension and assembly apparatus of the present invention, and FIG. 3 is an end elevation taken along lines 3—3 of FIG. 1.

Referring to FIG. 1, a gyroscope 10 includes a gyroscopic rotor 11 journaled in a bearing frame 12 for rotation in the direction indicated by the arrow around a spin axis 13 perpendicular to the plane of the paper. The rotor 11 is rotated by a conventional motor means not shown. The bearing frame 12 is rotatably mounted by means of its trunnions 14 and 15 that cooperate with spaced bearings 16 and 17 respectively which in turn are secured to a housing 20. The housing 20 encloses the gyroscope 10. The trunnions 14 and 15 define the axis of rotation 21 of the gimbal 12 which is also the precession axis of the gyroscope 10.

During the operation when the gyroscope 10 experiences acceleration in the direction of the axis 21, the gimbal 12 and, thus the rotor 11, tends to shift in the direction of the axis 21 thereby introducing mass unbalance which creates an undesirable error in the output signal from a pickoff 22 which senses the precession of the gyroscope 10. To prevent this axial shift of the gimbal 12 while permitting angular rotation thereof around the axis 21, the gyroscope 10 is provided with first and second torsion means 23 and 24 respectively.

The torsion means 23 includes an adapter element 25 having a threaded stud 26 that is screwed into a threaded aperture 27 within the trunnion 14. The aperture 27 is coaxial with the axis 21. The element 25 is screwed into the aperture 27 until a shoulder of the element 25 abuts the extremity of the trunnion 14. This also secures the inner race of the bearing 16 to the trunnion 14. The other extremity of the adapter element 25 has an opening 28 adapted to receive an enlarged extremity 30 of a torsion bar 31. The torsion bar 31 is preferably a flat, thin, resilient material which is necessarily delicate for reasons to be explained.

As shown more clearly in the exploded view 2, the extremity 30 of the torsion bar 31 is centrally located within the opening 28 by means of pins 32 and 33. The pins 32 and 33 have substantially the same diameter as the enlarged extremity 30 of the torsion bar 31 and they are of equal length in order that they centralize the extremity 30 within the opening 28. In this manner, the longitudinal axis of the torsion bar 31 is aligned with the axis 21. The pins 32 and 33 may be cemented within the opening 28 or they may be a press fit.

In a similar manner, the other enlarged extremity 34 of the torsion bar 31 is centrally secured within an opening 35 within another adapter 36 by means of similarly shaped pins 37 and 38.

The adapter 36 may then be screwed to a circular cap 40. The cap 40 has a flat surface 41 which cooperates with a matching flat surface 42 of a resilient member 43. The resilient member 43 is adjustably secured to the housing 20 by means of an adjusting screw 44 and a lock screw 45. The member 43 is positionable in the direction of the axis 21 by adjusting the screw 44 until a predetermined tensile load is applied by the torsion element 31 to the trunnion 14.

In a similar manner, a resilient member 50 at the other extremity of the gyroscope 10 is positionably adjusted by means of a lock nut 51 and an adjusting screw 52 to provide a tensile force on the trunnion 15 by means of a torsion bar 53 of the torsion means 24. Due to the limited space available between the end of the trunnions 15 and the associated end of the housing 20, the torsion means 24 is structurally different but performs the same function as the embodiment of the torsion means 23. The torsion means 24 includes a cap 54 and an adapter 55 which are identical to the cap 40 and the adapter 36 of the torsion means 23. The torsion elements 31 and 53 are also identical.

To reduce the over-all length of the torsion means 24, the torsion element 53 extends entirely through an adapter 56 in order that the enlarged extremity 57 of the torsion element 53 which is secured to the adapter 56 extends within the threaded aperture 60 in the trunnion 15. The torsion element 53 is secured to the adapters 55 and 56 in a manner similar to that described above with respect to the torsion means 23.

The torsion elements 31 and 53 are extremely delicate and require particular care during assembly and prior to operation to prevent breakage. To overcome this problem, the present invention also includes utilizing a pair of line-up rods for each of the torsion means 23 and 24. The line-up rods serve several purposes: (1) they provide preloading of the torsion bars to assure metal to metal contact between the torsion bar and its respective adapters, (2) they assure protection of the torsion means assembly during installation in the gyroscope, and (3) the rods themselves act as a spanner wrench during assembly in a manner to be explained. The torsion means 23 includes line-up rods 61 and 62. The rod 61 extends through an opening 63 in the adapter 36 and also through an opening 64 in the adapter 25. In a similar manner, the rod 62 extends through an opening 65 in the adapter 36 and in opening 66 in the adapter 25. The openings 63 and 65 are adapted to be aligned with the openings 64 and 66. The outer portions of the openings 63 and 65 are threaded and cooperate with matching threaded portions of the rods 61 and 63 respectively. To maintain a preload on the torsion bar 31, the rods 61 and 62 project through their respective cooperative openings 63 and 64, and 65 and 66. By screwing the rods 61 and 62 down into the openings 64 and 66 respectively, a preload is applied to the torsion bar 31 thereby preventing relative motion between the adapters 25 and 36 which prevents inadvertent breakage of the torsion bar 31. During assembly, by rotating the adapter 36, the adapter stud 26 is screwed into the trunnion 14 until the shoulder of the adapter 25 abuts against the extremity of the trunnion 14. When desired, the rods 61 and 62 are unscrewed and the cap 40 is finally adjusted by means of screws 70 and 71 more clearly shown in the end view of FIG. 3.

In a similar manner, the torsion means 24 includes rods 72 and 73 which prevent relative motion between the adapters 55 and 56.

While this invention has been described in its preferred embodiments, it is understood that the words which have been used are words of description rather than of limitation and that changes within the purview of the appended claims may be made without departing from the true scope and spirit of the invention in its broader aspects.

What is claimed is:

1. Apparatus for use in a gyroscope having a rotor mounted in a gimbal which in turn is supported for rotation by trunnions within a fixed housing wherein said apparatus prevents axial movement of said gimbal relative to said housing in the direction of the axis defined by said trunnions while permitting angular movement of said gimbal comprising,
    (1) first adapter means having one end operatively secured to one of said trunnions,
    (2) second adapter means having one end operatively secured to said housing,
    (3) said first and second adapter means being spaced apart with respect to each other along said axis,
    (4) a torsion element having enlarged extremities operatively secured to said first and second adapter means respectively,
    (5) each of said adapters having portions thereof adapted to receive a respective one of said enlarged extremities of said torsion element,
    (6) first and second pins of equal length and of a diameter substantially that of said enlarged extremities centrally secured said torsion element to said first adapter means,
    (7) third and fourth pins of equal length and of a diameter substantially that of said enlarged extremities substantially securing the other end of said torsion element to said second adapter means,
    (8) adjustable resilient means coupled to said torsion element for applying in adjustable force to said torsion element in the direction of said axis for maintaining said torsion element in tension,
    (9) and means operatively connected to said adjustable resilient means for adjusting said adjustable resilient means for applying a desired force to said torsion element for preventing axial movement of said gimbal while permitting angular movement thereof.

2. Apparatus for use in a gyroscope having a rotor mounted in a gimbal which in turn is supported for rotation by trunnions within a fixed housing wherein said apparatus prevents axial movement of said gimbal relative to said housing along the axis defined by said trunnions while permitting limited angular movement thereof comprising,
    (1) a first adapter having one end operatively secured to one of said trunnions,
    (2) a second adapter having one end operatively secured to said housing,
    (3) said first and second adapters being spaced apart with respect to each other along said axis,
    (4) a delicate torsion element having enlarged extremities operatively secured to said first and second adapters respectively,
    (5) each of said adapters having portions thereof adapted to receive a respective one of said enlarged extremities of said torsion element,
    (6) first and second pins of equal length and of a diameter substantially that of said enlarged extremities centrally securing one end of said torsion element to said first adapter,
    (7) third and fourth pins of equal length and of a diameter substantially that of said enlarged extremities centrally securing the other end of said torsion element to said second adapter,
    (8) adjustable resilient means coupled to said torsion element associated with said adapters for applying an adjustable force to said torsion element in the direction of said axis,
    (9) and means operatively connected to said adjustable resilient means for adjusting said adjustable resilient means for applying a desired force to said torsion element for preventing axial movement of said gimbal while permitting angular movement thereof.

3. Torsion element and assembly apparatus for a gyroscope having a rotor bearing frame supported for rotation about an axis by trunnions within a fixed housing,
    (1) a first adapter having one end operatively secured to one of said trunnions,
    (2) a second adapter having one end operatively secured to said housing,
    (3) said first and second adapters being spaced apart with respect to each other along said axis,
    (4) a delicate torsion element having extremities operatively secured to said first and second adapters respectively,
    (5) each of said adapters having portions thereof adapted to receive a receptive one of said extremities of said torsion element,
    (6) means securing said torsion element to said first and second adapters,
    (7) said first and second adapters having first and second axially disposed cooperative aperture means,
    (8) and first and second rods extending through said first and second aperture means respectively securing said first and second adapters with respect to each other whereby during assembly of said torsion element relative rotation of said first and second adapters and consequently twisting damage of the delicate torsion element is prevented.

References Cited by the Examiner

UNITED STATES PATENTS 1,797,913   3/1931   Henderson _____ 74—5

BROUGHTON G. DURHAM, *Primary Examiner.*

PALMER W. SULLIVAN, K. J. DODD,
*Assistant Examiners.*